US011775639B2

(12) United States Patent
Collier et al.

(10) Patent No.: US 11,775,639 B2
(45) Date of Patent: Oct. 3, 2023

(54) FILE INTEGRITY MONITORING

(71) Applicant: Sophos Limited, Abingdon (GB)

(72) Inventors: Nicholas James Collier, Didcot (GB); Nikolay Ivanov Nikolaev, Abingdon (GB); Chloe Acebes, Oxford (GB)

(73) Assignee: Sophos Limited, Abingdon (GB)

( * ) Notice: Subject to any disclaimer, the term of this patent is extended or adjusted under 35 U.S.C. 154(b) by 135 days.

(21) Appl. No.: 17/078,588

(22) Filed: Oct. 23, 2020

(65) Prior Publication Data

US 2022/0129551 A1  Apr. 28, 2022

(51) Int. Cl.
G06F 21/56 (2013.01)
G06F 21/54 (2013.01)

(52) U.S. Cl.
CPC .......... G06F 21/565 (2013.01); G06F 21/54 (2013.01); G06F 21/564 (2013.01); G06F 21/568 (2013.01)

(58) Field of Classification Search
USPC ........................................................ 726/22
See application file for complete search history.

(56) References Cited

U.S. PATENT DOCUMENTS

| | | | |
|---|---|---|---|
| 8,181,244 B2 | 5/2012 | Boney | |
| 8,201,243 B2 | 6/2012 | Boney | |
| 8,418,250 B2 | 4/2013 | Morris et al. | |
| 8,719,932 B2 | 5/2014 | Boney | |
| 8,726,389 B2 | 5/2014 | Morris et al. | |
| 8,763,123 B2 | 6/2014 | Morris et al. | |
| 8,856,505 B2 | 10/2014 | Schneider | |
| 9,413,721 B2 | 8/2016 | Morris et al. | |
| 9,578,045 B2 | 2/2017 | Jaroch et al. | |
| 9,984,248 B2* | 5/2018 | Ray | G06F 21/56 |
| 10,257,224 B2 | 4/2019 | Jaroch et al. | |
| 2005/0251860 A1* | 11/2005 | Saurabh | H04L 63/1416 726/23 |
| 2007/0240217 A1* | 10/2007 | Tuvell | H04L 63/145 713/188 |
| 2017/0302458 A1* | 10/2017 | Berger | G06F 21/554 |
| 2017/0316223 A1* | 11/2017 | Sathyadevan | G06F 21/554 |
| 2019/0081983 A1* | 3/2019 | Teal | H04L 9/3247 |
| 2019/0108341 A1* | 4/2019 | Bedhapudi | G06F 16/1752 |
| 2020/0036747 A1* | 1/2020 | Humphries | H04L 63/10 |
| 2020/0204574 A1* | 6/2020 | Christian | H04L 63/12 |

FOREIGN PATENT DOCUMENTS

| | | | | |
|---|---|---|---|---|
| CN | 107667376 A | * | 2/2018 | ........... G06F 21/604 |
| DE | 112018003006 T5 | * | 3/2020 | ............. G06F 21/53 |
| EP | 2691908 B1 | * | 12/2018 | ............. G06F 11/00 |

* cited by examiner

Primary Examiner — Sakinah White Taylor

(74) Attorney, Agent, or Firm — Strategic Patents, P.C.

(57) ABSTRACT

A file integrity monitoring system supports monitoring of system-critical, enterprise-critical and user-critical data by reporting events to a threat management facility in response to changes in certain files, folders, registry keys and registry values of the computing environment in which the system is operating and/or monitoring. The file integrity monitoring system may dynamically create, adapt and apply context-based rules to improve the sensitivity and relevance of reported events to undesirable changes in the data footprint of a monitored device.

20 Claims, 13 Drawing Sheets

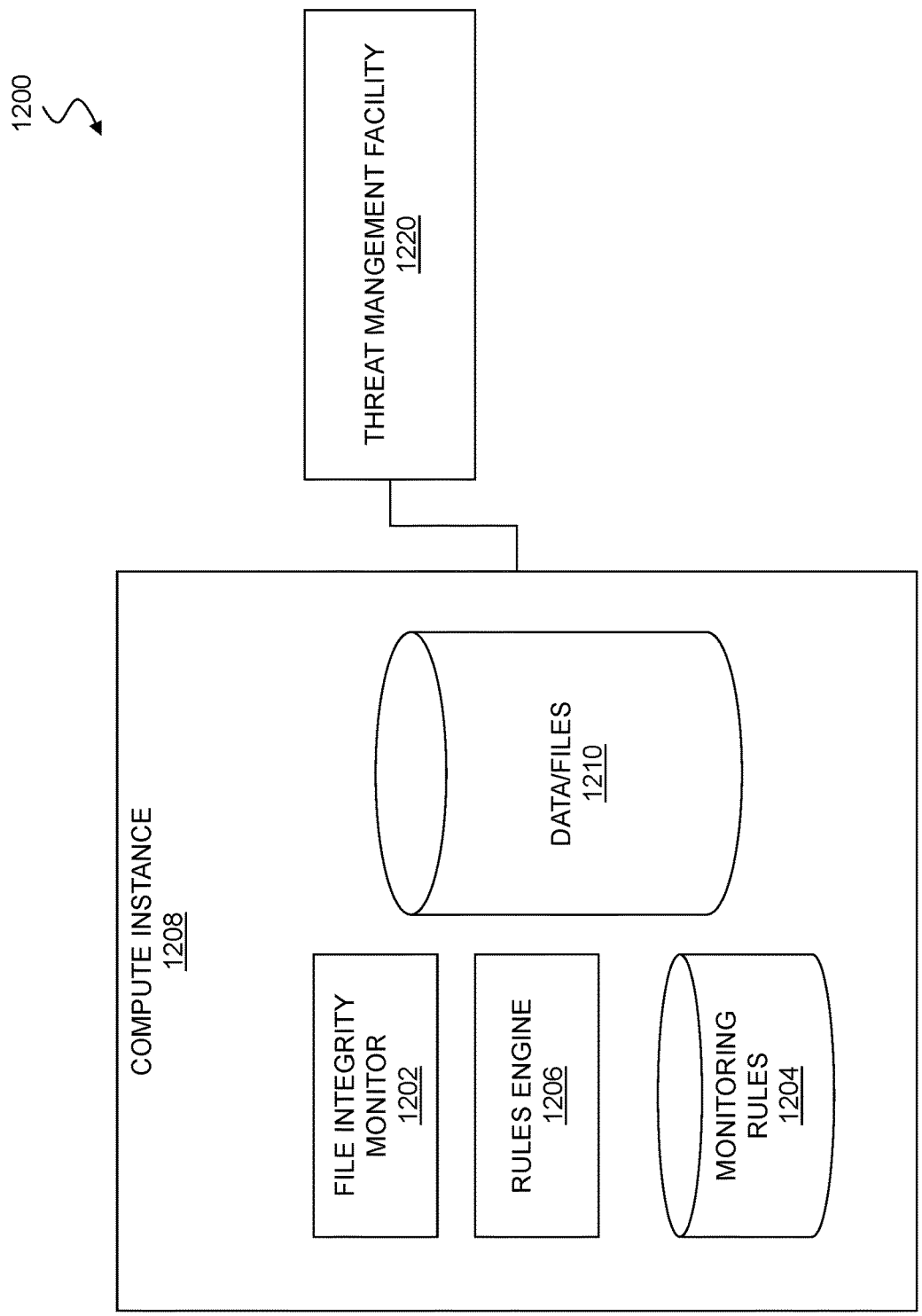

COMPUTE INSTANCE CONTEXT

☐ ATTEMPT TO TAMPER
☐ DATA LEAKAGE PREVENTION SIGNAL
☐ DATA LEAKAGE PREVENTION SPECIFICATION
☐ COMPROMISE
☐ APPLICATION REPUTATION
☐ AUTHENTICATION SOURCE
☐ TYPE OF INTERACTING APPLICATION
☐ RELATIONSHIP OF INTERACTING APP W/DATA
☐ DATA TYPE
☐ DATA SENSITIVITY
☐ THREAT MANAGEMENT SYSTEM CONTEXT
☐ INSTALLER INFORMATION
☐ DATA PATTERN DETECTION

☐ ALLOW DYNAMIC RULES TO IMPACT CUSTOM RULES
☐ ALLOW DYNAMIC RULES TO IMPACT OPERATING SYSTEM RULES

FILE INTEGRITY MONITORING

CROSS-REFERENCE TO RELATED APPLICATIONS

This application is related to U.S. patent application Ser. No. 16/165,274 filed on Oct. 19, 2018; U.S. patent application Ser. No. 16/383,315 filed on Apr. 12, 2019; and U.S. patent application Ser. No. 16/128,953 filed on Sep. 12, 2018. The entire contents of each of the foregoing is hereby incorporated by reference.

FIELD

The present disclosure relates to file integrity monitoring based on the use of compute instance context, such as event streams for recording, monitoring, and investigation of enterprise security.

BACKGROUND

As enterprise networks become more complex, and security threats become more sophisticated, there remains a need for improved techniques for monitoring integrity of data interaction events and for identifying and investigating potential threats to file integrity within the enterprise network.

SUMMARY

A file integrity monitoring system supports monitoring of system-critical, enterprise-critical and user-critical data by reporting events to a threat management facility in response to changes in certain files, folders, registry keys and registry values of the computing environment in which the system is operating and/or monitoring. The file integrity monitoring system may dynamically create, adapt and apply context-based rules to improve the sensitivity and relevance of reported events to undesirable changes in the data footprint of a monitored device.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 12 shows a system for managing use of compute instance context for dynamically adapting data monitoring rules.

FIG. 13 illustrates a compute instance context.

DESCRIPTION

Figure 1:
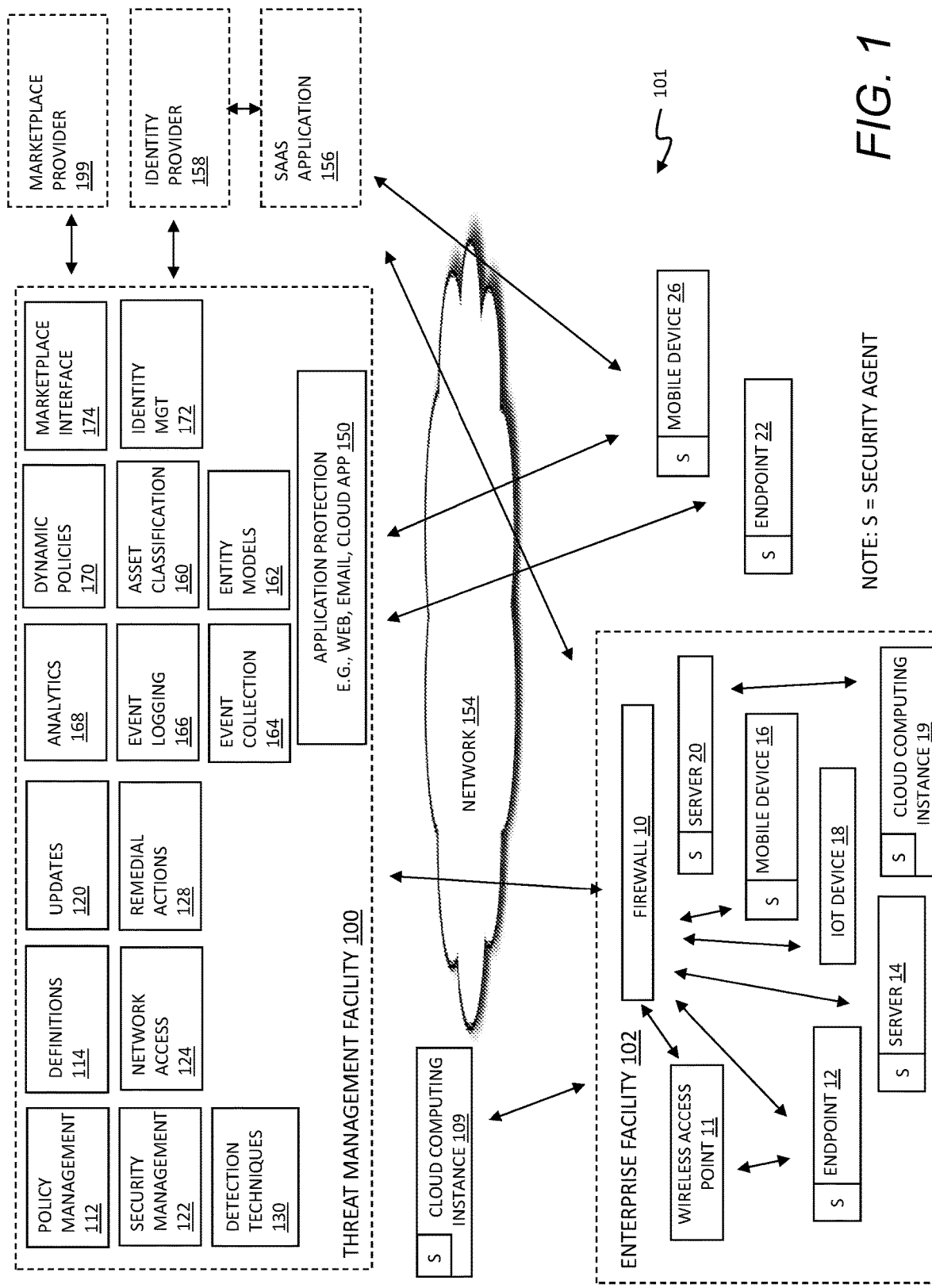
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 9, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 92, update facility 90, definitions facility 114, network access rules facility 94, remedial action facility 98, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 92.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 92 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 92 may provide malicious code protection to a compute instance. The security management facility 92 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 9, in a wireless access point 11 or firewall 10, as part of application protection 150 provided by the cloud, and so on.

In an embodiment, the security management facility 92 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 9, in a wireless access point 11 or firewall 10, as part of application protection 150 provided by the cloud, and so on.

In an embodiment, security management facility 92 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 9, in a wireless access point 11 or firewall 10, as part of application protection 150 provided by the cloud, and so on.

In an embodiment, the security management facility 92 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 9, in a wireless access point 11 or firewall 10, as part of application protection 150 provided by the cloud, e.g., from the threat management facility 100 or other network resource(s).

In an embodiment, the security management facility 92 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 9, in a wireless access point 11 or firewall 10, as part of application protection 150 provided by the cloud, and so on.

In an embodiment, the security management facility 92 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 9, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 90 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 92 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 92 for enforcement.

In embodiments, the threat management facility 100 may provide configuration management as an aspect of the policy management facility 112, the security management facility 92, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 9, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 90). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 90, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 90, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 92 may scan an outgoing file and verify that the outgoing file is permitted to be transmitted according to policies. By checking outgoing files, the security management facility 92 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 98. Aspects of the network access facility 94 may be provided, for example, in the security agent of the endpoint 9, in a wireless access point 11, in a firewall 10, as part of application protection 150 provided by the cloud, and so on.

In an embodiment, the network access facility 94 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., WINDOWS®, MACOS®, LINUX®, ANDROID™, IOS®). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 92, the remedial action facility 98 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
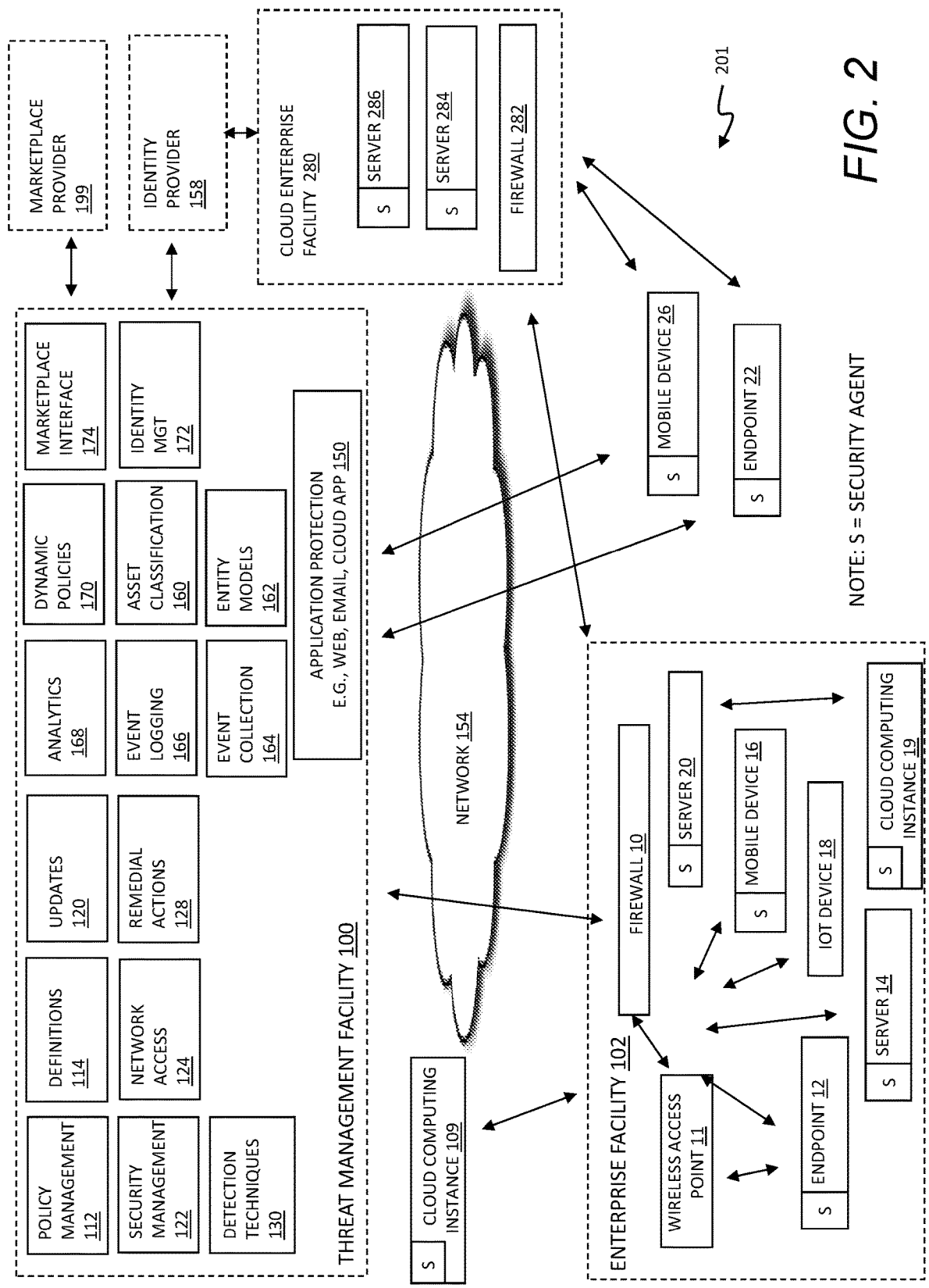
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
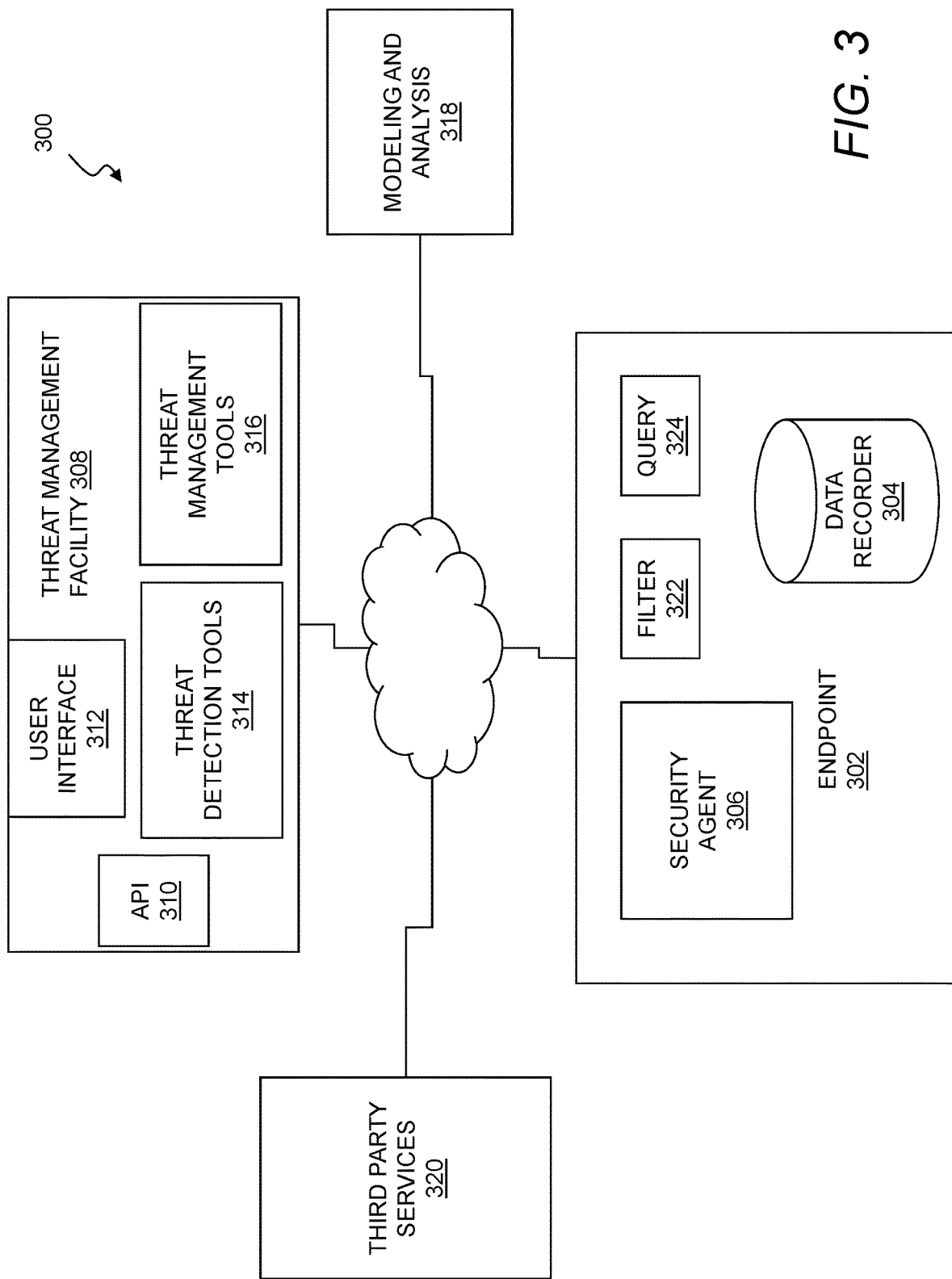
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
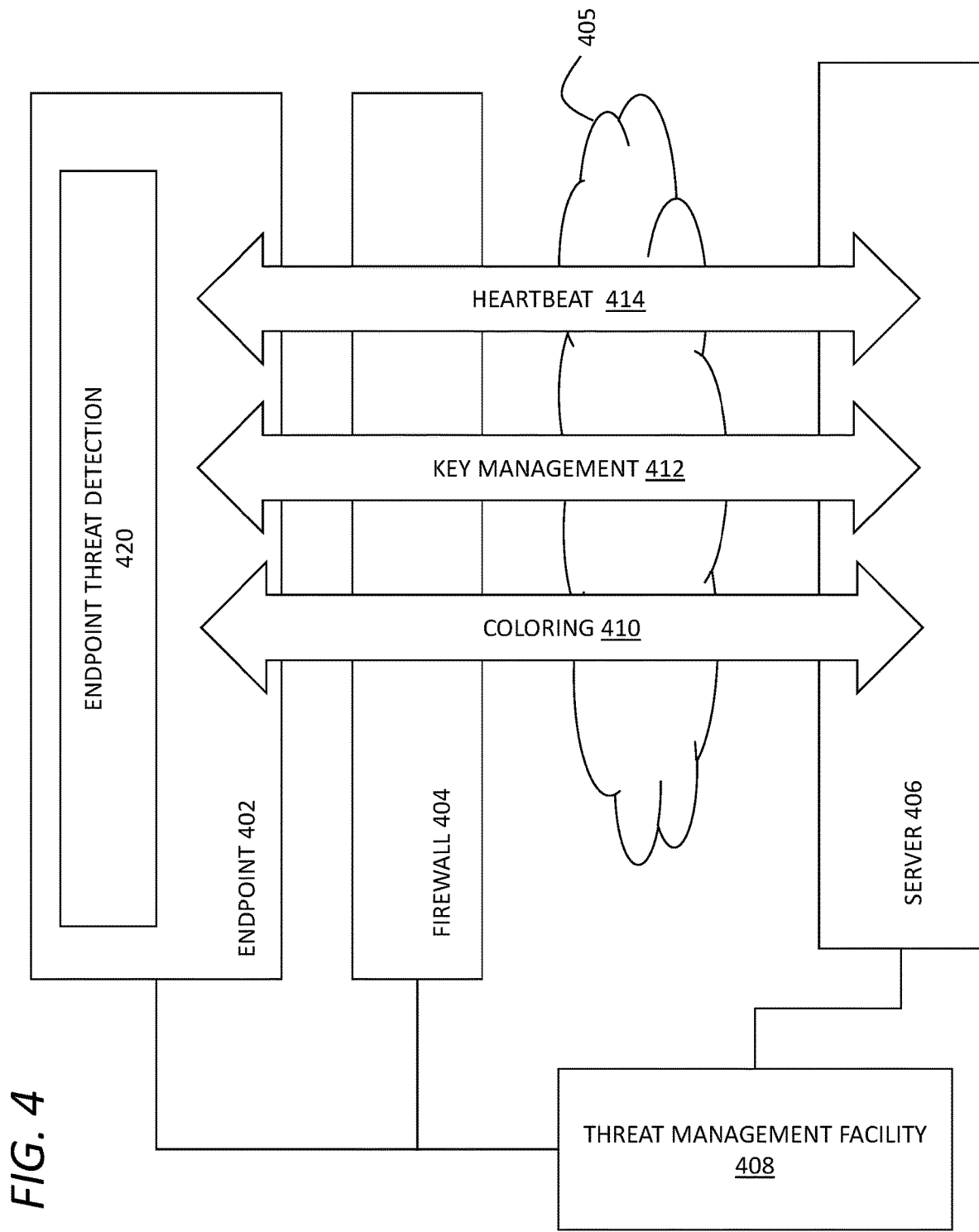
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
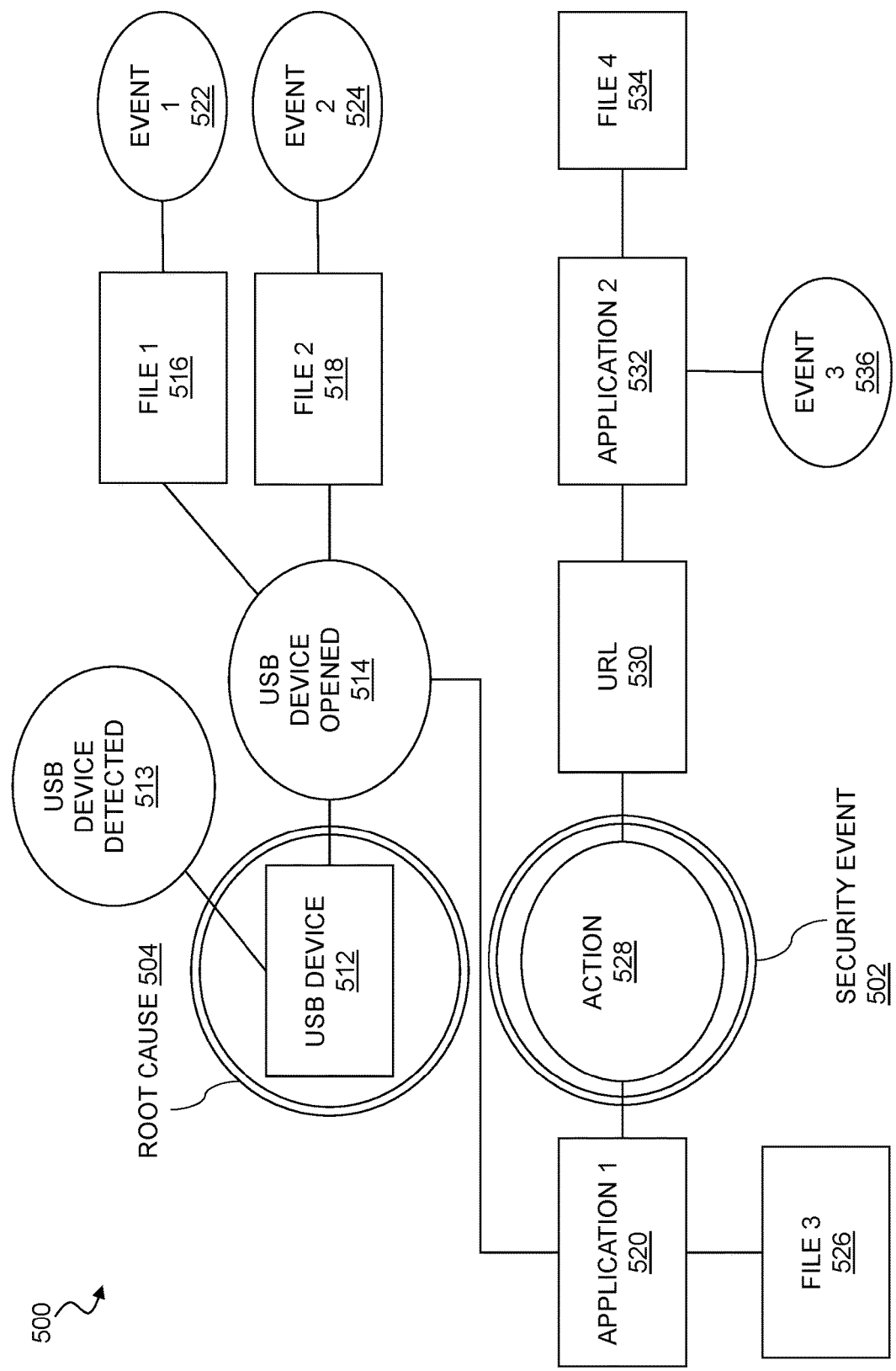
FIG. 5 illustrates an event graph stored by a data recorder.

FIG. 5 illustrates an event graph 500 stored by a data recorder such as any of the data recorders described herein. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs to assist in determining its root cause 504. The event graph 500 depicted in the figure is provided by way of example only, and it will be understood that many other forms and contents for event graphs 500 are also or instead possible. It also will be understood that while the figure illustrates a graphical depiction of an event graph 500, the event graph 500 may be stored in any suitable data structure or combination of data structures suitable for capturing the chain of events and objects in a manner that preserves causal relationships for use in forensics and malware detection as contemplated herein.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint or automatically by the endpoint in response to detection of the USB device 512. The USB device 512 may include one or more files and applications, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order—such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
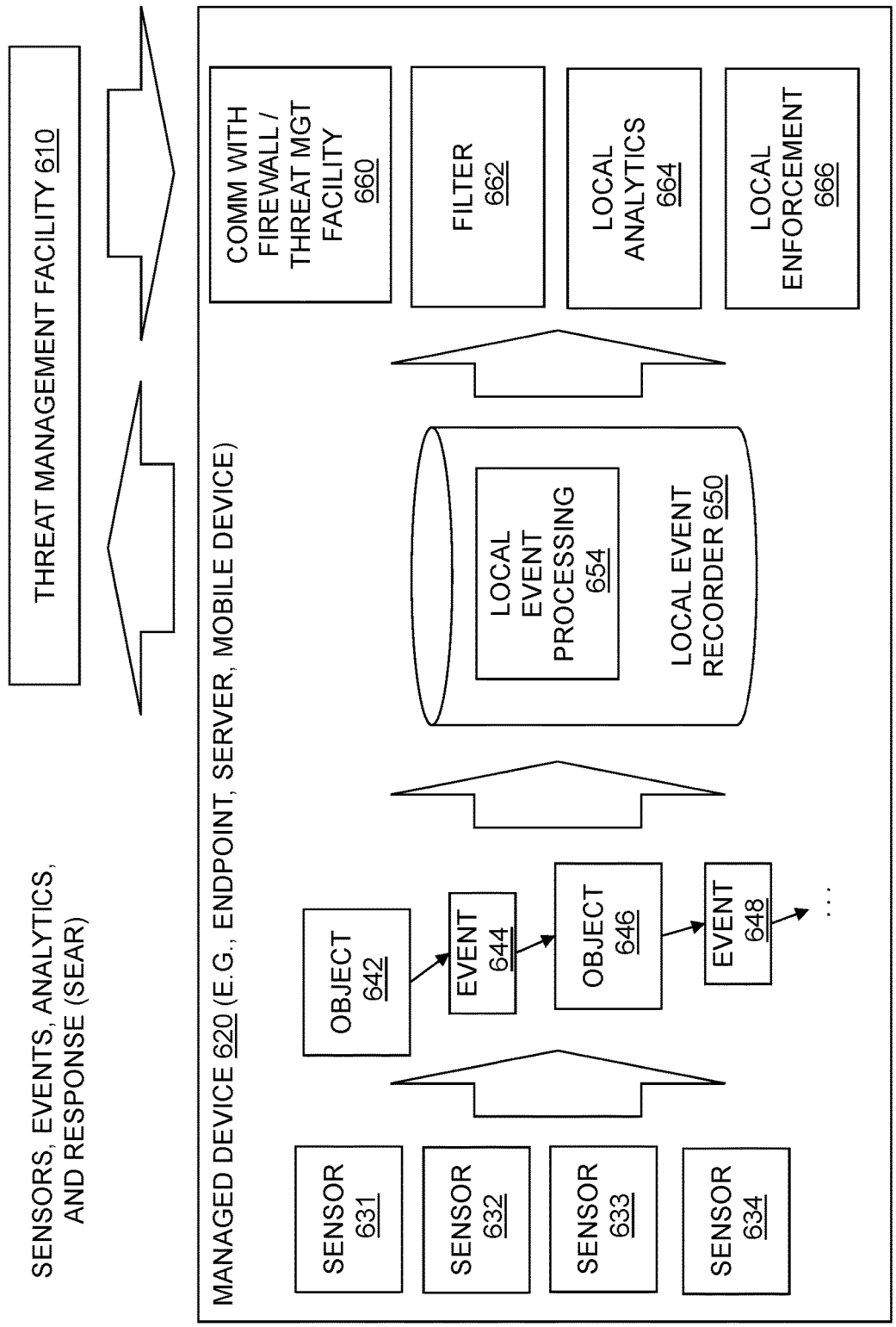
FIG. 6 depicts a Sensors, Events, Analytics, and Response (SEAR) environment.

FIG. 6 depicts a Sensors, Events, Analytics, and Response (SEAR) environment, which may be used on a compute instance 620 such as a managed device. The compute instance 620 may include sensors 631, 632, 633, 634 that produce data that are recognized as events according to the entity model. The sensors 631, 632, 633, 634 thus are sources of event information. The output of sensors 631, 632, 633, 644 may be objects 642 that are recognized as events 644. There may be multiple objects 642, 646 and events 644, 648 provided by a sensor. The events may be processed by a local event processing facility 654. The event processing may perform tokenizing and processing. Some events may be recognized and evaluated in real-time, other events may be evaluated in the context of other events. This may be stream or bulk processing. Events may have attributes (e.g., mandatory, optional (e.g., best effort), sensitive (tokenize it in local event store)), or associated contextual information.

A local event recorder 650 may be part of the event logging facility. Some recorded events may be stored locally and some may be communicated to another compute instance, such as the cloud. Some events will all be sent in real time, some only stored locally (and should be retrievable). An event filter 662 may be used to parse the events. Local analytics 664 on a compute instance may be used to locally identify events of interest. A communication facility 660 will communicate events to a central event store, such as a threat management facility 610, which may be a cloud facility. Local enforcement 666 may be used to take steps in response to events, as determined by the policy management facility 666. In embodiments, events can have attributes (e.g., mandatory, optional (e.g., best effort), sensitive (e.g., tokenize it in local event store)). Some events will all be sent in real time, some only stored locally (and should be retrievable).

A goal may be to discover as much as we can about the assets in the enterprise, and reduce surprises, such as compute instances that network administrators are not aware of, or unpatched compute instances, or valuable data leaving the enterprise.

As one non-limiting example, static policies may be assigned to access of files and data. Events involving files and data may be observed by sensors, for example, in a file system filter, generating events. The events may be determined to be of interest based on the policies.

Figure 7:
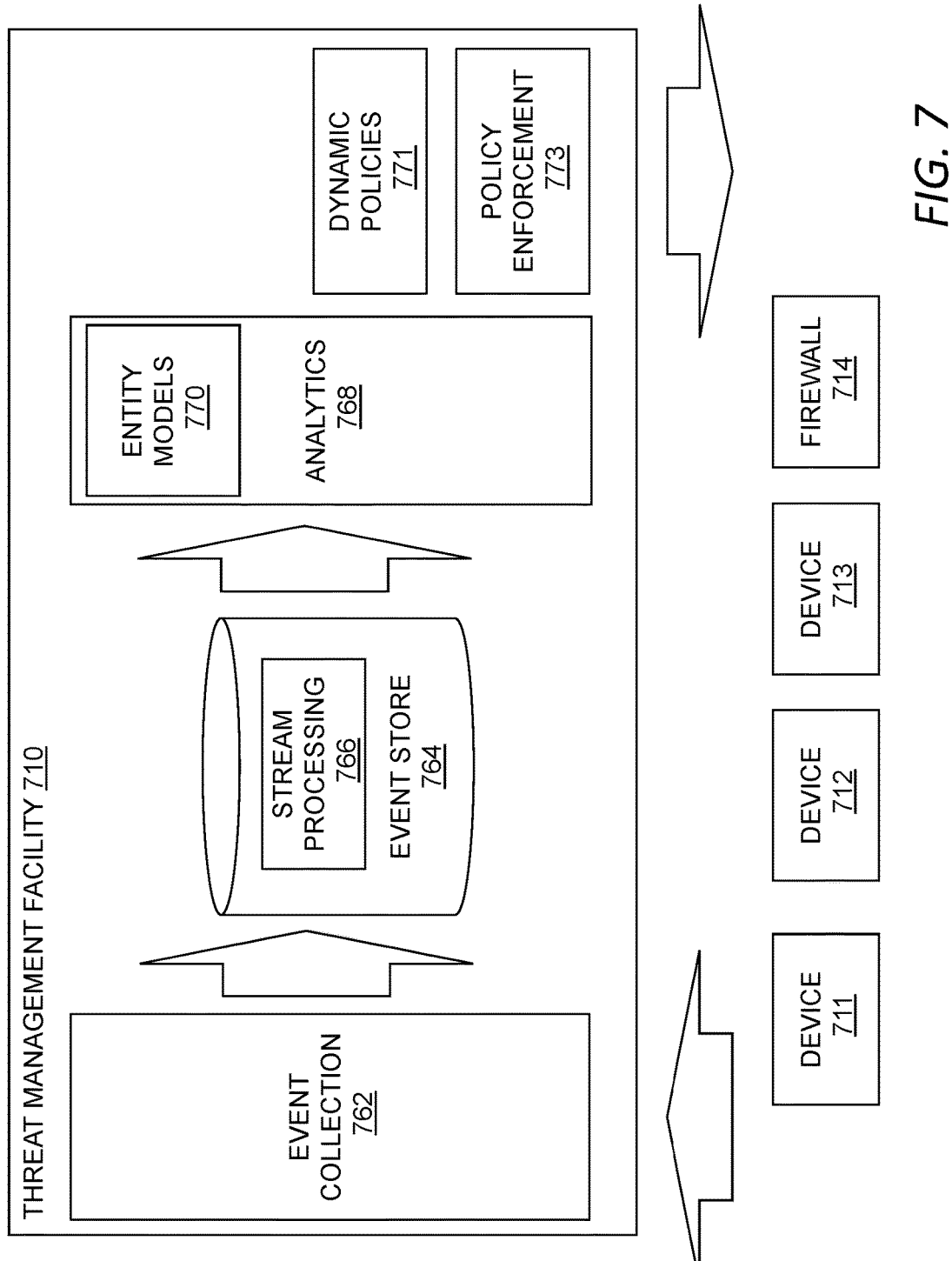
FIG. 7 depicts centralized event collection.

FIG. 7 depicts centralized event collection. Referring to FIG. 7, centralized event collection 700 may be used to receive and store events from various compute instances. Events are received at a threat management facility 710 by event collection 762. Events may be received from compute instances, shown for the sake of clarity of illustration as a device 711, a device 712, a device 713, and a firewall 714, although events may be received from any number or type of compute instances. Events may be stored in the event store 764, and also may be processed in real-time by the stream processing facility 766. The entity models 770 may be used by the analytics facility 768 to make observations and inferences based on the events.

In embodiments, events are continuously analyzed against a baseline. The baseline may be adjusted to account for normal behavior. Comparison to baselines may include looking for outliers and anomalies as well as impossible events. For example, if a user logs on from Germany and then logs in from San Francisco, that may be considered impossible. Comparisons may be made at different levels. For example, the entity may be compared to itself e.g., does this user on Monday compare to past activity. For example, the entity may be compared to its peer group, e.g., is a finance department member behaving similar to others. For example, the entity may be compared to other entities within the enterprise. For example, the entity may be compared to other users at similar enterprises in the same industry, or in the same location, as well as to the universe of all users.

Real-time and retrospective threat intelligence may also be included, as well as vulnerability information and patch information.

With a sufficient level of confidence in the inferences, active, adaptive responses may be taken. For example, dynamic policies 771 may be updated to better fit the security profile to the environment that has been discovered and observed, e.g., by adjusting security settings within a security policy or group of security policies. A policy enforcement facility 773 may enforce these updated dynamic policies 771 at compute instances, such as the compute instances 711-714.

In embodiments, high-interaction interfaces allow an admin to interact with the event store 764 to better understand the assets in the enterprise facility and for specific purposes, such as threat hunting.

Figure 8:
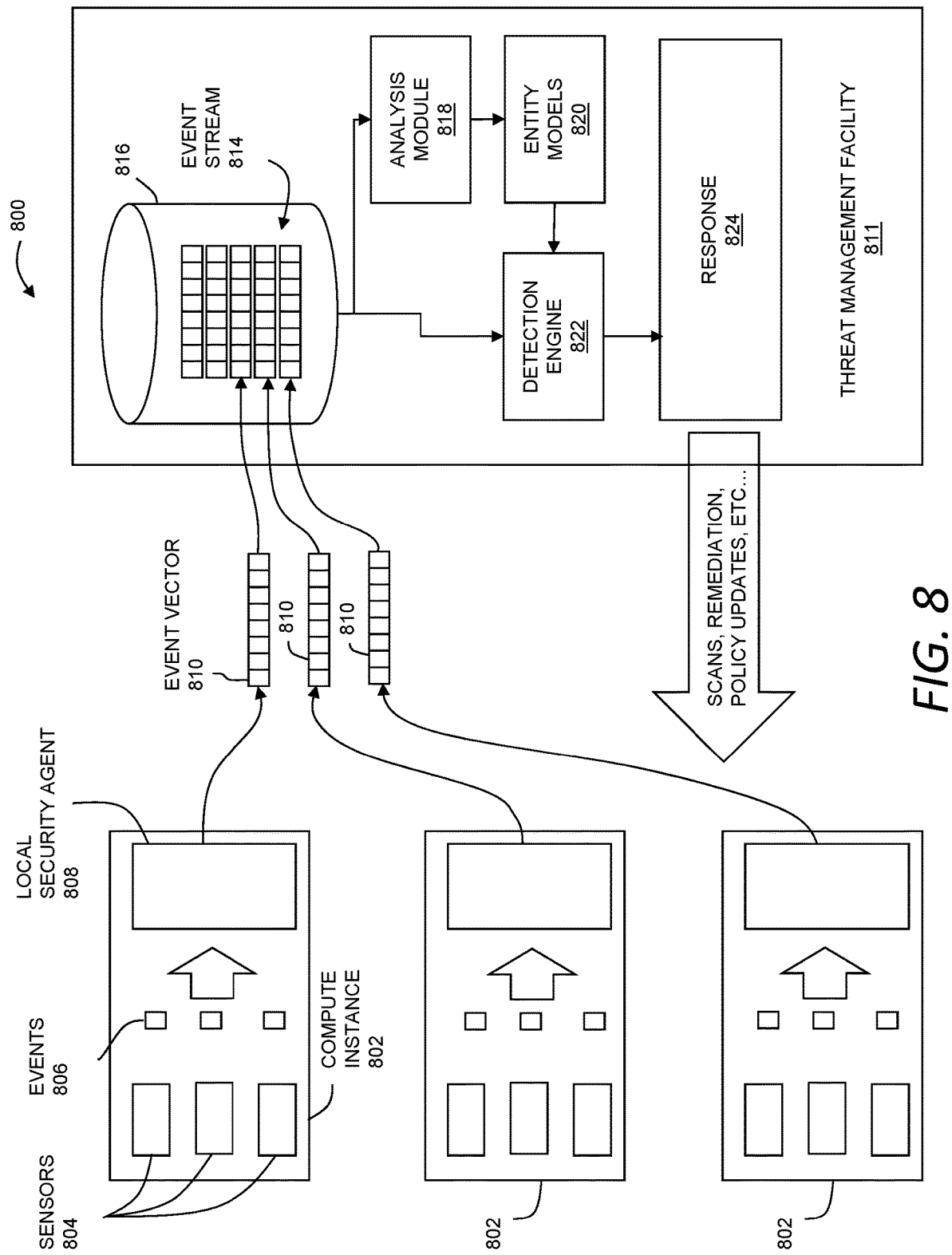
FIG. 8 shows a system for event monitoring and response.

FIG. 8 shows a system for event monitoring and response. In general, the system may include a number of compute instances 802 that use local security agents 808 to gather events 806 from sensors 804 into event vectors 810, and then report these event vectors 810 to a threat management facility 812. The threat management facility 812 may store the event vectors 810 from a number of compute instances 802 as a data stream 814 in a data repository 816 such as a memory or other data store of the threat management facility 812. The event stream 814 may be analyzed with an analysis module 818, which may in turn create entity models 820 useful for detecting, e.g., unexpected variations in behavior of compute instances 802. A detection engine 822 may be applied to the event stream 814 in order to detect unusual or malicious activity, e.g. based on the entity models 820 or any other techniques. Where appropriate, the threat management facility 812 may deploy responses to the compute instances 802 using a response facility 824.

The compute instances 802 may be any of the compute instances described herein, including without limitation any physical device such as a laptop, desktop, gateway, router, firewall, smartphone, tablet, or the like, as well as a virtualized instance of any of the foregoing or any other computer, user device, container, or the like. The sensors 804 and events 806 may also generally be any of the sensors and events described herein. The local security agent 808 may be any of the security agents described herein, or any other software component or the like executing on or in association with one of the compute instances 802 to locally manage security of the compute instance and/or coordinate security services with the threat management facility 812 and other remote resources.

The local security agent 808 may collect events 806 from sensors 804 on the compute instance 802, and form the collected events 806 into event vectors 810 for communication to the threat management facility 812. The sensors 804 and/or local security agent 808 may usefully process events 806 in a number of ways in order to facilitate communication, computational efficiency, or downstream processing. For example, events 806 may be tokenized. That is, a process that causes or creates an event 806 may be assigned a number or other identifier, which may be used locally by a compute instance or globally within the enterprise to identify a particular, known process. An event 806 may also encode (tokenized or otherwise) a relationship among different processes. For example, for a particular process that caused an event 806, a parent-child relationship or other dependency with other processes may be encoded by providing process identifiers or the like within the event 806, along with information characterizing the relationship among the processes. A Uniform Resource Locator or other information for identifying resources or network locations may also be tokenized or otherwise processed to support efficiency, consistency, and the like. For example, a URL may be encoded in an event 806 as a hash of a URL, or as a portion of a URL, or some combination of these (e.g., a literal encoding of the top level domain, and a hash of some or all of the remaining path information). Other events 806 such as registry changes, system calls, remote procedure calls and the like may be literally encoded into an event 806 where they are relatively compact, or identified using any suitable tokenization, compression, or the like.

Other techniques may also or instead be used. For example, user-specific or machine-specific information may be altered where appropriate to anonymize the event vectors 810 and mitigate exposure of sensitive information during network communications. An event vector 810, or individual events 806 therein, may also or instead be encrypted in order to secure the contents against malicious interception. In another aspect, the events 806 or event vectors 810 may be compressed to conserve network resources. The event vectors 810 may also or instead be prioritized, e.g., in order to increase sensitivity and decrease response times for event vectors 810 associated with a high likelihood of malicious activity. In this latter aspect, the local security agent 808 may locally analyze events 806 and/or event vectors 810 in order to permit suitable prioritization, as well as to support local detection and response to malicious, or potentially malicious activity.

It will also be appreciated that events 806 and/or event vectors 810 may usefully be labelled in a variety of ways. While labeling with process identifiers is described above, this may also or instead include an identification of an entity associated with the event 806 or event vector 810. In this context, the entity may be any physical, logical, or conceptual entity useful for monitoring activity of compute instances 802 as described herein. For example, the entity may include a user, a physical device, a virtualized machine, an operating system, an application, a process, a hardware subsystem (e.g., a network interface card, USB drive, camera, etc.), a network resource, a domain controller, a remote software service, and so forth. It should also be understood that the various entity types may be concurrently associated with a particular event 806, sensor 804, or event vector 810, or particular events 806 may be associated with multiple entities or event vectors 810. Thus for example, storing a file may be an event 806 associated with a particular user, a particular machine, a particular operating system, a particular physical storage device, and so forth.

In one aspect, the event vectors 810 may be organized around entities. Thus for example, a request for access to a network resource may be an event 806. When such a request is initiated by a user, an event vector 810 for that user may be created and reported along with other temporally adjacent or otherwise related events 806 associated with that user. Where the network request involves an interaction with, e.g., an authentication and identity management system, this may be represented as another entity, or as an event 806 (or group of events 806) in the event vector 810 for the user. At the same time, a second event vector 810 for the compute instance 802 may also be created and reported along with other temporally adjacent or otherwise related events 806 associated with that compute instance 802. Alternatively, the event vectors 810 may be organized around chronology. That is, groups of events 806 within a window of time may be reported as an event vector 801. The event vectors 810 may also or instead be organized around other aspects of the system 800, such as particular sensors 804 or groups of sensors 804, causal relationships among events 806, particular triggers, types of activity (e.g., network communications, operating system, processes, etc.) and so forth. In general, the source of each event 806, such as a particular sensor 804, or some entity, computing object or the like associated with the sensor 804, may be encoded with the event 806 to permit explicit identification by the threat management facility 812 or other downstream processing resources. Although depicted in FIG. 8 as having similar size, it will also be understood that the event vectors 810 may be any size, and may usefully encode any number of different events 806.

The event vectors 810 may be received by the threat management facility 812 and stored as an event stream 814 in a data repository 816, which may be any data store, memory, file or the like suitable for storing the event vectors 810. The event vectors 810 may be time stamped or otherwise labeled by the threat management facility 812 to record chronology. In general, the event stream 814 may be used for analysis and detection as further described herein.

In general, an analysis module 818 may analyze the event stream 814 to identify patterns of events 806 within the event stream 814 useful for identifying unusual or suspicious behavior. In one aspect, this may include creating entity models 820 that characterize behavior of entities, such as any of the entities described herein. Each entity model 820 may, for example, include a multi-dimensional description of events 806 for an entity based on events 806 occurring over time for that entity. This may be, e.g., a statistical model based on a history of events 806 for the entity over time, e.g., using a window or rolling average of events 806.

The entity models 820 may, for example, be vector representations or the like of different events 806 expected for or associated with an entity, and may also include information about the frequency, magnitude, or pattern of occurrence for each such event 806. In one aspect, the entity model 820 may be based on an entity type (e.g., a particular type of laptop, or a particular application), which may have a related event schema that defines the types of events 806 that are associated with that entity type. This may usefully provide a structural model for organizing events 806 and characterizing an entity before any event vectors 810 are collected, and/or for informing what events 806 to monitor for or associate with a particular entity.

As an event stream 814 is collected, a statistical model or the like may be developed for each event 806 represented within the entity model so that a baseline of expected activity can be created. In one aspect, an existing model may be used, e.g., when the entity or entity type is already known and well characterized. The entity model may also or instead be created by observing activity by the entity (as recorded in the event stream 814) over time. This may include, for example, monitoring the entity for an hour, for a day, for a week, or over any other time interval suitable for creating a model with a sufficient likelihood of representing ordinary behavior to be useful as a baseline as contemplated herein. In one practical example, certain software applications have been demonstrated to yield a useful baseline within about two weeks. It will also be understood that, once an entity model is created, the entity model may usefully be updated, which may occur at any suitable intervals according to, e.g., the length of time to obtain a stable baseline, the amount of activity by the entity, the importance of the entity (e.g., to security, operation of a compute instance 802, and so forth), or any other factors.

These techniques may be used to create an entity model 820 for any of the entities described herein, including without limitation physical hardware items, virtualized items, software items, data and date stores, programming interfaces, communications interfaces, remote resources, and so forth, or any of the other entities, computing objects, assets or the like described herein. In one aspect, the entities may be arranged around a conceptual stack for an endpoint in an enterprise network, such as by providing entities for a domain controller, a compute instance, a user, an operating system, a library, an application, a process, and data. This may also or instead include any of a number of physical devices such as a laptop, a desktop, a gateway, a router, a firewall, a smartphone, a tablet, a personal computer, a notebook, a server, a mobile device, an IoT device. The entity may also or instead include hardware subsystems such as a peripheral, a keyboard, a mouse, a display, a network interface card, a USB drive, a camera, a disk drive or other physical storage device, and so forth. The entity may also or instead include a virtualized instance of any of these physical devices or systems, or any other virtualized compute instance or other computing resource such as a virtual machine, a hypervisor, or the like. In another aspect, this may include computing objects or resources such as a container, an operating system, a library, an application, a process, a file or other data, or the like. An entity may also or instead include remote resources, such as a cloud computing resource, cloud data resource, remote software service, or any other network resource or the like. An entity may also include other entities such as a user or related identity, or more specific system resources such as a kernel driver, system registry, process cache, and so forth. More generally, any physical, virtual, logical, or other computing resource, asset, or the like that can usefully be instrumented and/or monitored to provide events for use as contemplated herein may be an entity as that term is used in this description.

As noted above, the entities of interest here may exist non-exclusively at various levels of hardware and software abstraction, and the entity models may similarly be of varying and overlapping scope. By way of a non-limiting example, an entity model for a laptop may include applications running on the laptop. In one aspect, the entity model may incorporate all network activity by the laptop, while in another aspect, network activity may be associated with the entity models for specific applications. Or the network activity may be associated with both entities, e.g., such that a single event is incorporated into multiple event vectors associated with multiple entities. In general, these design choices may affect the granularity of detections, the amount of processing and communications overhead, and so forth, and any such variations consistent with deployment within an enterprise network as contemplated herein are intended to fall within the scope of this disclosure.

According to the foregoing, in one aspect an entity model may contain a schema or the like describing events associated with an entity (or a type of entity), along with information about normal or expected behavior for each event 806 associated with the entity. In one aspect, an entity type (e.g., laptop, or laptop by manufacturer X, or virtual machine in environment Y) may be used to select a schema for an entity model, while activities of a particular instances of that entity type may be used to generate the baseline for the entity model used in detections and the like. Thus, for example, if a user installs an office productivity suite, an entity model for that entity type may be selected based on the types of events 806 known to be associated with the use the application, or the capabilities of the application. However, different users may use the software differently, so the baseline of expected behavior may be evaluated for a particular installation of the application by monitoring activity of the application over time. In another aspect, the schema for an entity model may itself be extensible. That is, the schema of different events 806 may be created based on observations of activity associated with the entity. When a new type of event 806 is detected for that entity, the event 806 may be added to the schema for a corresponding entity type.

Once an entity model 820 has been created and a stable baseline established, the entity model 820 may be deployed for use in monitoring prospective activity. This monitoring may, for example, use the same event stream 814 that was used to create the entity model 820, or a filtered or otherwise processed version of the event stream 814. It will be appreciated that the entity models 820 may generally be deployed as fixed or relatively static or discrete models, or any one or more of the entity models 820 may be continuously updated so that they change over time as new information becomes available, e.g., in the event stream 814 or otherwise.

The detection engine 822 may compare new events 806 generated by an entity, as recorded in the event stream 814, to the entity model 820 that characterizes a baseline of expected activity. By representing the entity model 820 and the event vectors 810 in a common, or related, vector space, deviations from expected behavior can usefully be identified based on the vector distance between one or more event vectors 810 and the entity model 820. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event vector 810 should be classified as within the baseline activity characterized by the entity model.

It will be understood that, while event vectors 810 and entity models 820 as described herein provide one useful technique observing deviations from a baseline of expected behavior by entities within an enterprise, the detection engine 822 may also or instead employ other detection techniques based on the event stream 814, e.g., to support real time detection of suspicious or malicious behavior. For example, certain events 806 may be independently and directly indicative of malicious activity, such as initiating communications with a known command and control center for an advanced persistent threat. Other events 806 may be potentially indicative of malicious activity, such as initiating disk-wide encryption or transmitting sensitive information from an endpoint. While tools exist for detecting these types of malicious activity, relevant events 806 may be present in the event stream 814, and the response facility 824 may usefully trigger additional analysis, investigation, or other responses based on the event stream 814 instead of or in addition to monitoring for deviations from entity baselines. In another aspect, concurrent deviations by different entities, or a pattern of deviations for a single entity or among entities, may also be usefully monitored. For example, a deviation in the behavior of a trusted application across multiple compute instances 802, either concurrently or in succession, may indicate a rollout of a software update rather than malicious behavior. Conversely, if a number of compute instances 802 concurrently begin contacting an unknown network address, this may be an indication of malware propagating among devices in an enterprise network. More generally, deviations among different entities, or among multiple instances of a particular entity, may provide useful information about actual or potential causes of the change, and may inform subsequent manual or automated investigations.

In general, where the event stream 814 deviates from a baseline of expected activity that is described in the entity models 820 for one or more entities, any number of responses may be initiated by the response facility 824 of the threat management facility 812. In one aspect, this may include deployment of known remediations for malicious activity such as quarantine, termination of network communications, termination of processes or applications, an increase in local monitoring activity on affected compute instances 802, messages to a network administrator, filtering of network activity, antivirus scans, deployment of security patches or fixes, and so forth. This may also in policy updates. For example, security policies for compute instances 802, users, applications or the like may be updated to security settings that impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth.

Figure 9:
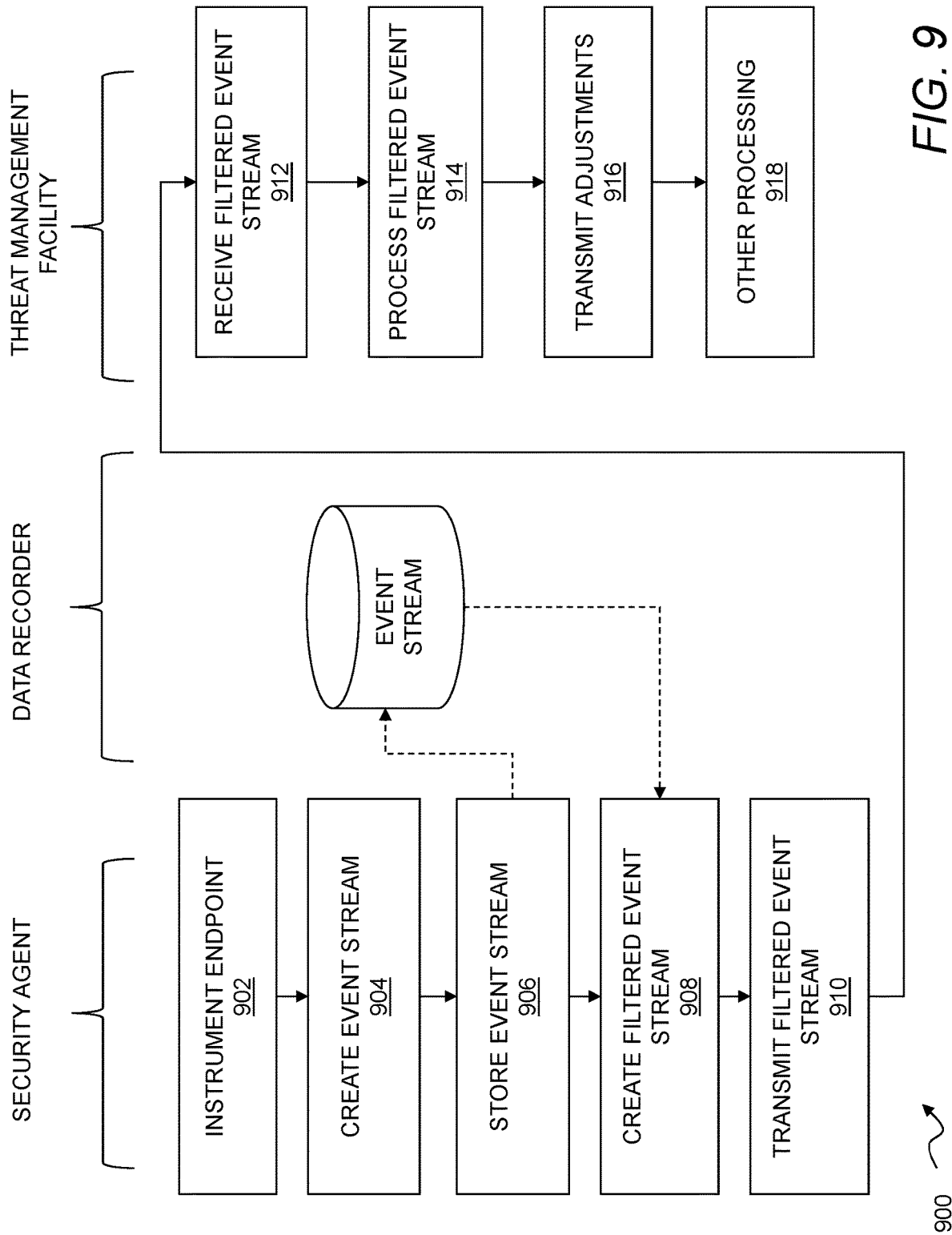
FIG. 9 shows a flow chart of a method for dynamic filtering of endpoint event streams.

FIG. 9 shows a flow chart of a method for dynamic filtering of endpoint event streams. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. In order to support dynamic threat response, the locus and level of detection applied by the local agent can be controlled by the threat management facility.

As shown in step 902, the method 900 may include instrumenting the endpoint, e.g. with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, a secure kernel cache, or any other data or data structure stored on an endpoint or communicated to or from the endpoint. Similarly, the types of changes may be any types of changes that might usefully be monitored in a threat management context as contemplated herein. For example, the endpoint may be instrumented to detect file reads and writes, but not file opens or closes. Or the endpoint may be instrumented to monitor inbound and outbound electronic mail, but not outbound electronic mail to other users within the enterprise. As another example, the endpoint may be instrumented to monitor changes to operating system registry entries by non-system processes, or to monitor read/write activity that substantially increases file entropy. More generally, any types of changes that might contribute to a determination of suspiciousness or safety can usefully be monitored, with instrumentation of suitable, corresponding computing objects, all as contemplated herein.

As shown in step 904, the method 900 may include creating an event stream from the local agent including each type of change to each of the computing objects detected on the endpoint.

As shown in step 906, the method 900 may include storing the event stream in a data recorder on the endpoint. This may generally be an unfiltered event stream containing additional event data not including in a filtered event stream that is sent to a threat management facility, and may include some or all of the event data that the endpoint is instrumented to detect. For example, the unfiltered event stream may include additional ones of the plurality of types of changes to the plurality of computing objects in a filtered event stream, or changes to additional ones of the plurality of computing objects not included in the filtered event stream.

As shown in step 908, the method 900 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource. It will be understood that, while the filtered event stream is illustrated as flowing from the event stream stored by the data recorder, the filtered event stream may also or instead be created directly by a security agent as the unfiltered event stream is captured and forwarded to the data recorder for storage.

Processing the event stream with the filter may also include locally adjusting the filter at the endpoint, e.g., in response to local changes detected on or by the endpoint. For example, the level of filtering may be locally adjusted by the endpoint based on a reputation score for one or more processes, files, or the like on the endpoint. This filtering may be done for all detectable events on the endpoint, or for specific processes. Thus, for example, when a reputation for a new process or other computing object is unknown, the endpoint may decrease filtering to provide greater data reporting to the threat management facility for that particular process. Thus, while step 916 below contemplates controlling the filter from a central threat management facility or the like, the filter may also or instead be controlled locally on an endpoint in response to changes in security posture, policy compliance posture, or any other events, context, malware detections, and so forth.

In one aspect, the filtered event stream may be arranged around anchor points such as a file, a domain name, or any other useful piece of data or metadata for which the presence can be monitored on an endpoint. For example, a file hash may be created for a file and used to test for the presence of that file on endpoints throughout an enterprise. Whenever this anchor point, e.g., the corresponding file hash, is detected on an endpoint, a collection of related events, metadata, context and so forth may be added to the filtered event stream for reporting to a central threat management facility.

In another aspect, the level of filtering may be locally controlled based on factors or requirements other than threat detection. For example, an event stream may be filtered to remove personal identifying information, e.g., for compliance with data privacy regulations. As another example, filtering may be controlled based on network usage restrictions, e.g., so that a particular endpoint does not exceed a predetermined hourly, daily, or weekly quota of bandwidth for event reporting.

Further, it will be understood that the filtered event stream may include synthetic events that characterize other collections of events in a single event or condensed group of events. This approach advantageously permits more compact communication of relevant information to a threat management facility, as well as more compact storage of information on the endpoint. In one aspect, the synthetic events may be stored by the data recorder in place of (e.g., to reduce memory requirements) or in addition to (e.g., to reduce communications requirements while preserving a more complete log or related activity) more detailed logging of granular events on the endpoint. In another aspect, the data recorder may store complete event details, and the endpoint may (e.g., with the security agent) create synthetic events dynamically to facilitate more compact communication to the threat management facility.

As shown in step 910, the method 900 may include transmitting the filtered event stream to a threat management facility. The filtered event stream may be transmitted at any suitable frequency including periodic, aperiodic, or other scheduled transmittal, as well as pushed transmittal (e.g., at intervals determined by the endpoint) or pulled transmittal (e.g., at intervals determined by the threat management facility, or any combination of these. Thus, for example, the endpoint (or security agent on the endpoint) may periodically report the filtered event stream on a predetermined schedule, with supplemental transmittals provided when the security agent detects a potential threat, or requested when the threat management facility detects a potential threat.

As shown in step 912, the method 900 may include receiving the filtered event stream at the threat management facility.

As shown in step 914, the method 900 may include processing the filtered event stream at the threat management facility to evaluate a security state of the endpoint. This may include any processing suitable for analyzing the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. In another aspect, processing the filtered event stream may include monitoring for changes that bring the endpoint out of compliance with a security policy for an enterprise, or otherwise present an actual or potential risk to network security for the enterprise.

As shown in step 916, the method 900 may include conditionally transmitting adjustments to filtering by the endpoint. For example, the method 900 may include, in response to a predetermined security state detected by the threat management facility, transmitting an adjustment to the endpoint for at least one of the types of changes or the computing objects used by the filter to process the event stream. This may include transmitting an adjustment to a filter used by the endpoint to select which of the plurality of types of changes to the plurality of computing objects the data recorder reports in the filtered event stream. Thus, for example, when the security state indicated by the filtered event stream is a potentially compromised state of a file, process or the like, the threat management facility may decrease filtering in order to receive more data about various changes to or by computing objects on the endpoint. This may include general changes to the level of filtering, or targeted changes that focus on specific computing objects or types of changes that might be related to a potential compromise. In one aspect, the adjustment to endpoint filtering may include a change to the subset of types of changes included in the filtered event stream, such as by increasing the types of changes included in the filtered event stream when the endpoint is potentially compromised, or decreasing the types of changes included in the filtered event stream when a potential compromise has been remediated. The adjustment may also or instead include a change to the subset of computing objects included in the event stream, such as by monitoring additional processes, directories or the like when a potential compromise is detected.

Adjustments may also be made to filtering by other endpoints within an enterprise network. For example, where a compromise is detected on one endpoint, behaviors or other patterns detected in the (filtered) event stream for that endpoint may be used to adjust the filtering on other endpoints to facilitate the detection of similar or related patterns elsewhere within the enterprise network. Similarly, endpoints or data resources known to contain high business value assets may have filtering adjusted to facilitate more detailed and frequent monitoring of related assets.

In another aspect, filtering may be adjusted independently of the current filtered event stream, e.g., based on other context. For example, when an employee is about to leave a company, filtering may be reduced on or removed from any associated compute instances so that computing or network activity can be more closely monitored until departure.

As shown in step 918, the method 900 may include other processing based on the filtered event stream. For example, the method 900 may include correlating the filtered event stream to a malware event on the endpoint and searching for the malware event on one or more other endpoints coupled to the enterprise network based on a pattern of events in the filtered event stream. In another aspect, the method 900 may include storing the filtered event stream at the threat management facility. In another aspect, the method 900 may include, when the filtered event stream shows that the security state of the endpoint is compromised, initiating a remedial action, e.g., using any of the remediation tools available to the threat management facility.

According to the foregoing, there is also disclosed herein a system including an endpoint and a threat management facility. The endpoint may execute a data recorder to store an event stream including a plurality of types of changes to a plurality of computing objects detected on the endpoint, and the endpoint may execute a local agent to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint. The threat management facility may be further configured to respond to a predetermined change in the security state by transmitting an adjustment to the endpoint for at least one of the types of changes or the computing objects used by the filter to process the event stream. In one aspect, the threat management facility may be configured to initiate a remediation of the endpoint when the security state of the endpoint is compromised.

Figure 10:
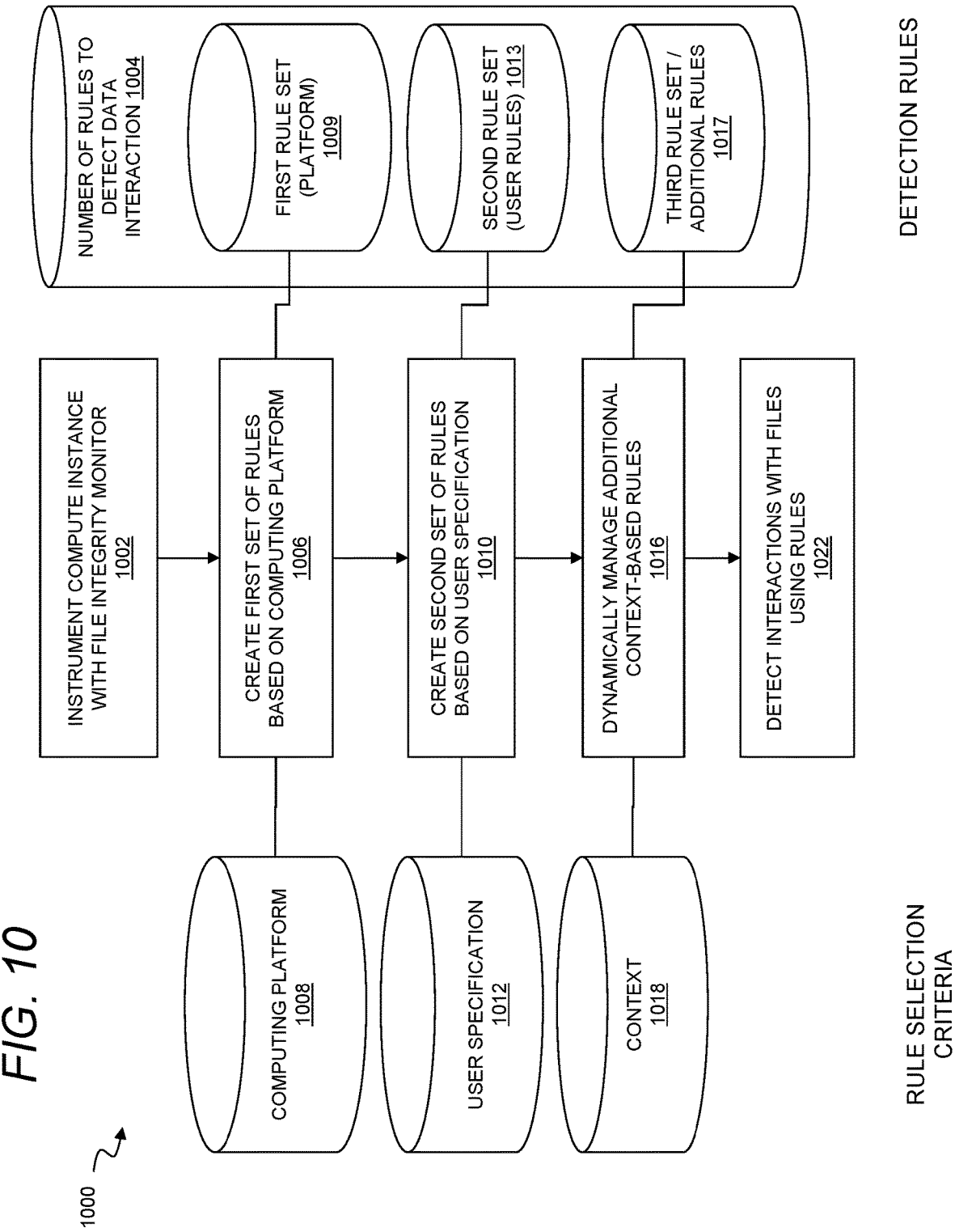
FIG. 10 shows a flow chart of a method for monitoring file integrity.

FIG. 10 shows a method for configuring data integrity monitoring for a compute instance. Modern computing environments may experience ongoing changes to data, such as user data, system data, protected data, and the like. In general, a data integrity monitoring system (also referred to herein as a data integrity monitor or file integrity monitor) may support monitoring of data, such as system-critical data by reporting events of interactions with monitored data. The events may be reported to a threat management facility, e.g., as part of unified system integrity approach. In general, the reports may be generated in response to changes in certain files, folders, registry keys and registry values. A data integrity monitoring system may further apply context-based rules to improve sensitivity and relevance of reported events to undesirable changes in the data footprint of a monitored device. Yet further a data integrity monitoring system may dynamically create, adapt and apply context-based rules to a system event stream monitoring process that relies on the rules to identify changes that may impact integrity of data of a computing environment. Therefore, reference herein to rules that impact monitoring activity associated with a computing environment, such as an endpoint in an enterprise network may also apply to monitoring a stream of activity, such as an event stream of the computing environment. The event stream, as variously described herein may include substantially all data-related events, such as file access, registry changes, file creation and other actions and a data integrity monitoring system or process may apply rules when processing such an event stream. In embodiments, a data integrity monitoring process, service, and/or system may determine, through application of rules as described herein, a subset of system events to be reported to a threat management facility and the like.

Methods and systems of file integrity monitoring described herein extend prior art monitoring systems by intelligently using the breadth and depth of information that is available about the operation and activity of compute instances and networks as well as a variety of available controls to enrich compute instance-specific data integrity monitoring. The methods and systems of file integrity monitoring further provide data integrity monitoring needed by an organization that is dynamic and able to adapt to changes in compute instances, which as described above are many.

Just as one example, a file integrity monitoring facility may define and enforce policies that control a granularity and type of data to monitor as well as what constitutes a potential integrity impacting access. Administrators may update and/or establish policies that the file integrity monitoring facility may use to dynamically and automatically generate integrity monitoring rules. The file integrity monitoring facility may update user and system generated monitoring rules and enforce those rules at various levels of control that are available, such as using data from data leakage prevention systems and the like to adapt a user designated policy for monitoring data on the compute instance. The file integrity monitoring facility may provide many different services, and rule and policy management may be offered as one of the services.

A file integrity monitor may be tasked with monitoring data in a computing environment to track changes to this data and evaluate file interactions for risks of malicious or otherwise harmful activity. With the complex, dynamic nature of computing environment data, including updates to operating systems, updates to applications, alterations to system registry values, changes in device drivers and system settings, and so forth, merely monitoring for changes to a predetermined set of files may prove inadequate. If too few data sources are monitored, changes that impact system integrity may be overlooked. On the other hand, excessive scope or frequency of monitoring may negatively impact system performance. In order to select a suitable level of monitoring, while adapting to changes in the compute context over time, data integrity monitoring may be dynamically adjusted according to changes in the compute context. At the same time, user input into monitoring rules may be permitted in order to facilitate monitoring based on human expertise or knowledge.

As shown in step 1002, the method 1000 may include instrumenting a compute instance with a data integrity monitor that, when executed on a compute instance, uses a number of monitoring rules to monitor compute instance data integrity, such as some or all of the number of rules to detect data interaction 1004.

As shown in step 1006, the method 1000 may include selecting data monitoring rules based on a computing platform 1008 for the compute instance. For example, a set of monitoring rules may be selected based on the operating system type or version (e.g., WINDOWS®, MACOS®, LINUX®, ANDROID™, IOS®, and others). In general, an operating system will have information relevant to monitoring for data/file integrity stored in known files or predetermined locations such as protected operating system files, configuration files, registry entries and the like. Thus the first set of rules may be selected from a first rule set 1009 based in whole or in part on the operating system of the computing platform 1008. Corresponding rules may be created based on information from an operating system provider or some other trusted source of rules for file integrity monitoring specific to each operating system. The first rule set 1009 may also or instead include monitoring rules based on general knowledge about operating systems. For example, operating systems may have certain critical files that are known to be similar in function or structure across different types of operating system, and these files may be designated for monitoring across multiple operating systems.

Configuring this first rule set 1009 of operating system-focused rules may be performed at least in part by the compute instance or by a separate compute instance that provides, for example at least a portion of the first rule set 1009. In one aspect, an operating system provider may publish data to monitor, e.g., files, registry settings, directories, and so forth. In another aspect, the provider may publish file integrity monitoring rules that are suitable for direct import into and/or integration with this first rule set 1009. In another aspect, step 1006 may include receiving a list of system data sources (e.g., files, directories, drives, registry entries, registry values, hardware locations and the like) to monitor, detecting an operating system executing on the compute instance and automatically constructing the first rule set, selecting a set of operating system-related data monitoring rules from a library of rules sets based on aspects of the operating system, applying a default set of operating system data monitoring rules instrumented with the integrity monitor, and the like.

It will be understood that, while the operating system provides one useful criterion for selecting where and what to monitor on a compute instance, other aspects of the computing platform 1008 may also or instead be used to select specific monitoring rules. For example, a fixed set of monitoring rules may be provided for hardware configurations, virtualization environments, application suites, and so forth. Any corresponding information about the computing platform 1008 useful for selecting among rules or groups of rules for file integrity monitoring may be applied as computing platform information to create the first set of rules as described herein.

As shown in step 1010, a second rule set may be configured responsive to a file integrity monitoring specification 1012 from a user. In general, a second rule set 1013 of the number of rules 1004 that a compute instance data integrity monitor may use for monitoring integrity of data may reference user-specified files or data sources. Users may provide input (through any suitable user interface) descriptive of data sources for monitoring. This may include filenames, file extensions, directories, registry keys, memory locations or areas, and so forth. This descriptive information may form a user specification for file integrity monitoring 1012. In an example, a user specification for file integrity monitoring 1012 may identify a set of user files, directories, and other data sources. In response, rules may be established or updated based on the second rule set 1013 or a portion thereof for monitoring the specified data sources. In general, step 1010 may include receiving a list of resources (files, directories, locations, drives, and the like) in any suitable manner specified by the user, and using these user specifications to select or create rules for data integrity monitoring.

As shown in step 1016, a third rule set 1017 of the number of rules 1004 may be configured and managed for use by a data integrity monitor based on a context 1018 for a compute instance. These additional rules may be dynamically configured and/or managed at step 1016 based on, for example, changes in the context 1018 of the computing instance. Sources of context information may include configuration information, connectivity, software versions, users, patterns of network usage, connections to other endpoints and resources within a network, and so forth, any of which may change over time, and may be used to dynamically select from rules in the third rule set 1017 for data integrity monitoring. In one aspect, the context may be evaluated using events, event streams, or event vectors as described herein in order to detect specific risks and select specific, corresponding rules, or in order to evaluate a general need for monitoring based on the security posture of an endpoint. In another aspect, other threat information such as coloring or heartbeat analysis may be used to identify risks and/or select monitoring rules dynamically for an endpoint. These additional rules, which may align with either of the other two rule sets (system rule set 1009 and/or user rule set 1013), or may be independent thereof, may be used to adjust how a data integrity monitor detects file or data interactions, and further how an endpoint handles such interactions when detected.

In embodiments, dynamically managing the third rule set 1017 may include providing rule sets based on one or more of Payment Card Industry standards, Health Insurance Portability and Accountability Act (HIPAA) standards, and General Data Protection Regulation standards. As an example, a HIPAA standard may designate certain types of information in a health data record as critical for ensuring proper treatment of the patient associated with the record, so changes to that data may preferably be monitored to ensure integrity thereof. These rule sets may be selectively applied based on criteria such as data types, data sources, file types, authors, authorized users, file metadata and the like, any of which may explicitly or implicitly identify data as related to or governed by corresponding standards of security, confidentiality, and so forth. These various standards may be dynamically applied to generate suitable rules for monitoring data and files, and/or to manage rule selection according to the context 1018.

As shown in step 1022, the method 1000 may include detecting interactions with data or files on the compute instance using any combination of rules selected from the number of rules 1004 based on the computing platform, user specifications, and the context for the compute instance. This may generally include selecting a first set of rules from the first rule set 1009 (based on the platform), selecting a second set of rule from the second rule set 1013 (based on user specifications), and selecting a third set of rules from the third rule set 1017 (dynamically, based on context). This aggregated set of rules may be used by a file integrity monitor for ongoing monitoring of the compute instance.

Figure 11:
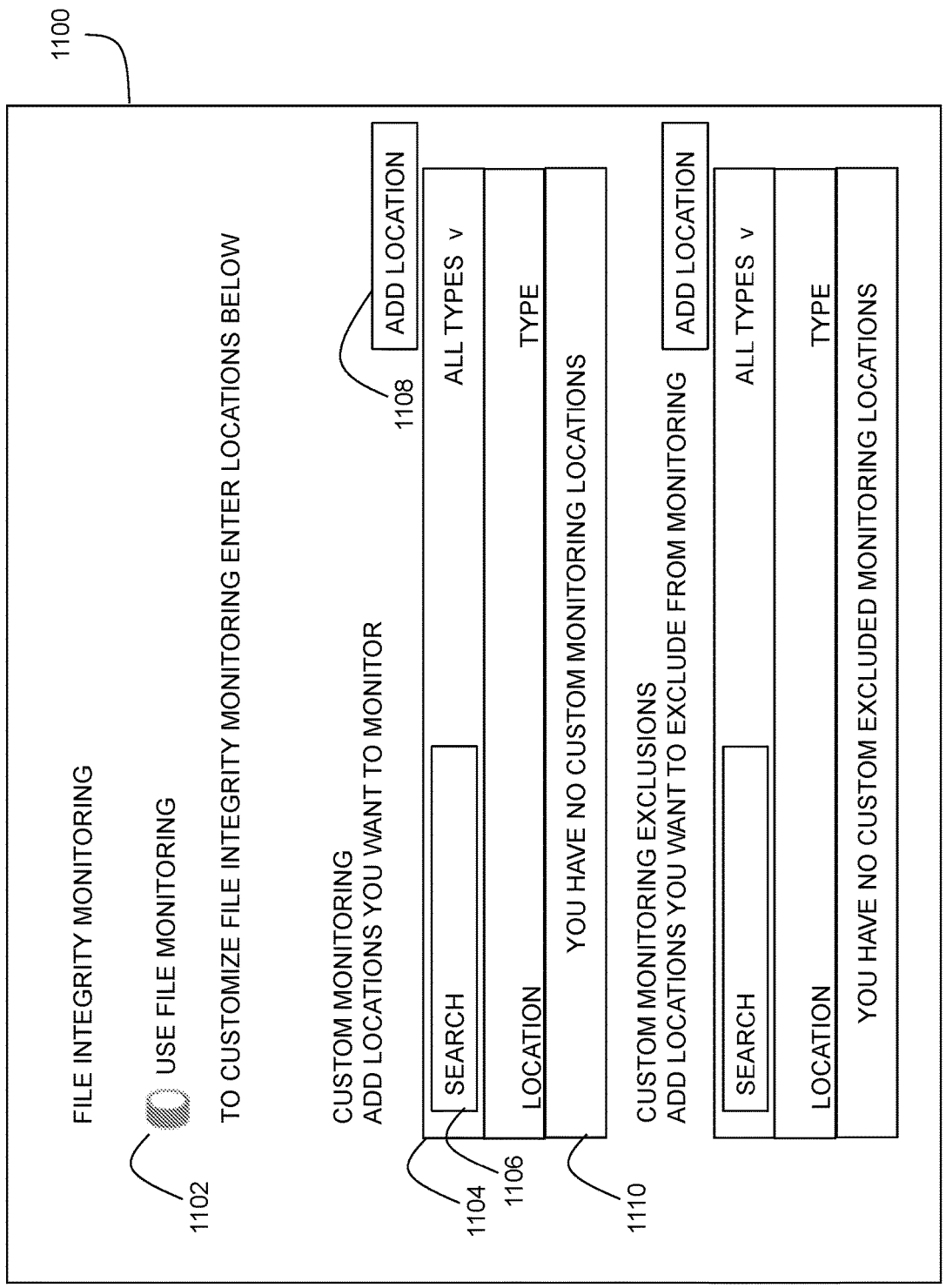
FIG. 11 shows a user interface for a file monitoring system.

FIG. 11 shows a user interface 1100 for a file monitoring system. In general, the user interface 1100 may support any of a variety of interface control objects for controlling the manner in which a file integrity monitoring system is deployed, and may support the creation and configuration of user-specified rules for where and what to monitor. The user interface 1100 may include a master activation switch 1102 that causes the file integrity monitor to be enabled or disabled. The interface 1100 may further include a custom location monitoring input section 1104 with a custom monitoring location data entry field 1106. A user may input path names, file information (file name, file extension, author, creation date, user permissions, access control, etc.), or other descriptive information in this data entry field 1106 and a list of potential matches may be responsively displayed (not depicted) to the user so that the user can select one or more of the displayed items for data monitoring. In addition to entering text information in field 1106, the data entry field 1106 may automatically suggest options or autocomplete user entries, or the user interface 1100 may provide drop down menus, checkboxes, or other preconfigured lists from which a user may select monitoring options. A user may also or instead designate or filter results based on location type (e.g., only directories, only files, only registry entries, and the like). Locations for monitoring that are added by the user (e.g., by selecting the add location button 1108) may be displayed in the custom monitoring locations list 1110.

The user interface exemplarily depicted in FIG. 11 may include a second section 1112 through which a user may designate monitoring exclusions. The exclusion designation section 1112 may operate similarly to the input section 1104 with the result representing data sources that are to be excluded from monitoring, or at least from reporting. Thus in general, a user may use the user interface 1100 to specify items (locations, filenames, file types, registry entries, etc.) for inclusion in a monitoring profile used by the file integrity monitoring system, or the user may specify items for exclusion from the monitoring profile.

FIG. 12 shows a file integrity monitoring system. The file integrity monitoring system 1200 may include a file integrity monitor 1202, a number of file integrity monitoring rules 1204, and a rules engine 1206.

The file integrity monitor 1202 may deployed on a compute instance 1208 such as any of the endpoints or other computers or compute instances described herein, e.g., as a component of a local security agent or other local security component(s). The file integrity monitor 1202 may generally be configured to monitor activity affecting data and/or files 1210 on the compute instance 1208 based on the file integrity monitoring rules 1204, for example using any of the instrumentation or event detection techniques described herein. The file integrity monitor may also or instead report events that impact file integrity in response to indications of interactions with the data/files 1210 on the compute instance 1208, e.g., to a local security agent or to a threat management facility 1220 for an enterprise network.

The number of file integrity monitoring rules 1204 may include any set of fixed and/or dynamic rules selected for use by the file integrity monitor 1202 in monitoring activity on the compute instance 1206. This may include any of the monitoring rules described herein. For example, the file integrity monitoring rules 1204 may include a first set of rules by which the file integrity monitor 1202 detects indications of changes in files based on characteristics of an operating system (or platform or the like) for the compute instance 1208 and a second set of rules by which the file integrity monitor detects indications of changes in the data and/or files 1210 based on a data monitoring specification received from a user. It will be understood that, while depicted as resident on the compute instance 1208, the monitoring rules 1204 may also or instead be stored on the threat management facility 1220, and may be deployed to the compute instance 1208 on an as-needed basis, e.g., based on changes in the configuration of the compute instance 1208 or the user specification of selected rules. Similarly, the user specification for the second set of rules may be provided locally on the compute instance 1208, or remotely, e.g., through a user configuration interface or the like hosted at the threat management facility.

The rules engine 1206 may adapt the number of file integrity monitoring rules 1204 based on a context of the compute instance 1208 in order to dynamically adjust the set of file integrity monitoring rules 204 that are applied by the file integrity monitor 1202 based on additional information about the compute instance 1208 provided by the context. In general, the rules engine 1206 may be deployed on the compute instance 1208, at the threat management facility 1220, or some combination of these. Similarly, the rules 1204 may be deployed on the compute instance, on the threat management facility 1220, or some combination of these. In one aspect, current rules being used by the file integrity monitor 1202 may be stored on the compute instance 1208, while other context-based rules and the like may be stored on the threat management facility where they are available for retrieval as needed by the compute instance 1208.

The context of the compute instance 1208 may, in general, facilitate dynamic adaptation of the rules 1204 to the current operating context for the compute instance 1208. This may take a variety of forms. In an example, compute context may impact how a rule in the second (user) rule set is processed. In the example, a portion of a set of data sources specified by a user may not need further monitoring based on system context, such as portions of a data base or a directory that have been deleted. For example, if a user deletes a file or directory location, the rules may be adapted to stop monitoring those locations. This may occur implicitly under various circumstances, such as when an upgrade of a user application results in deprecation of certain files that were utilized by the prior version of the application. Through this context of the compute instance (the upgrade of the application), a user rule to monitor all files in a directory can effectively be changed so that only a subset of the files in the directory are monitored. In another example of dynamic adaptation of the rules 1204, a directory that is excluded from monitoring (e.g., changes in the directory are not monitored and/or changes in the directory are filtered out of a stream of system changes being monitored) may dynamically be added to the rules 1204 when a monitored file (e.g., a file with controlled content) is copied to the directory. The data integrity monitor may process a stream of system activity and determine that the monitored file has been copied. Alternatively, as new files are created, even in unmonitored directories, the data integrity monitor may establish/adapt a rule to determine if the content of the newly created file should be monitored and update the monitoring rules 1204 accordingly. When the file integrity monitor determines that the directory no longer contains files with controlled content, further changes to that directory may be excluded from generating monitoring alerts and the like by adapting the monitoring rules 1204. In embodiments, adapting the rules 1204 to monitor the previously unmonitored directory may include adding a rule to the set and/or adapting an existing rule that indicates that the directory should not be monitored. Similarly, when it is determined that the directory no longer contains controlled data files (or sub directories and the like) a rule that was dynamically added to the rule set 1204 may be dynamically removed.

A data integrity monitor may rely on security and integrity facilities for context. For example, data from a content control facility, a data control facility, a leakage prevention facility, a threat management facility, and the like executing on the compute instance may gather and/or analyze compute instance context, any of which may be relevant to file monitoring. Some compute instance context rendered by these other facilities may not directly indicate how the context should affect data integrity monitoring rules. However, to the extent that these system components gather actionable data structures for the data integrity monitor (e.g., a list of files to monitor based on confidentiality, reputation, source, and so forth), this information may be applied to contextually adapt file integrity monitoring.

Useful context for dynamically selecting monitoring rules may include indications of actual or potential tampering with protected files. A rules engine or the like may receive an indication of a tamper attempt that may include information useful for generating and/or adapting data monitoring rules, such as a directory of protected files, an application or process determined to be at least in part a cause of the tamper attempt, and the like. As an example, the rules engine may generate and/or update data integrity monitoring rules so that the directory of protected files is monitored for data interactions. Context may also or instead include detections from a data leakage prevention system for the compute instance 1208. A rules engine or the like may receive the signal and act, such as by adding the source of the actual or potential leakage (e.g., a file or directory targeted by the suspected leakage event) to an existing data integrity monitoring rule, generating a new data integrity monitoring rule and the like.

Context may also or instead include context indicative of compromise for the compute instance based on local monitoring, remote monitoring, or some combination of these. A rules engine or the like may receive an indication of the compromise and act, such as by activating a data monitoring rule to monitor all executable files on the compute instance, or files associated with detected malware, a specific malware detection event, a root cause, or the like. Context may also or instead include information from an installer of one or more applications installed on the computer instance. A rules engine or the like may receive the information and based thereon, adapt one or more data monitoring rules and/or create one or more additional data monitoring rules, e.g., to monitor a new directory or new registry keys created during an installation.

Context may include an authentication level of a source of interactions with certain data or files on the compute instance. A source of interactions with the data, such as an application executing on the compute instance, a user accessing the compute instance (e.g., through a user interface) and the like may be determined by the file integrity monitor or other security application or service executing on the compute instance, and a security or authentication identity (e.g., a security certificate indicating access privileges of the source) may be associated with the identified source of interactions. The file integrity monitor may dynamically adapt existing integrity monitoring rules, or create new rules, based on this security or authentication information. In an example, security information for an application interacting with data on the compute instance may indicate that the application is permitted to interact with a subset of data on the compute instance. A corresponding rule may be adopted that facilitates detecting interactions with the subset of data, but does not report interactions by the designated application. In this way, the subset of data may be monitored to ensure reporting of interactions with the subset that may impact integrity, such as requests by an application other than the authenticated or authorized application. While authentication information may be dispositive regarding a need for reporting access to the subset of data, data integrity monitoring rules regarding access by this application may also or instead include additional conditions, such as timing of interaction, frequency of interaction, sequence of interaction, result of interaction (e.g., what has changed) and the like.

Context may include a type of application interacting with files or data. A type of application can, for example, be encoded into a file integrity monitoring rule as one of one or more conditions that the file integrity monitor evaluates when an interaction with monitored data is detected. If a type of application (e.g., a user interface) is inconsistent with a permitted type, no interaction may be reported. However, if the type is not permitted, or is otherwise not an expected user of the data/file, the file integrity monitor may report such activity as potentially impacting integrity of data on the compute instance.

Context used by the compute instance to dynamically adapt monitoring rules may also or instead include a type of information detected in the data. In an example, a data integrity monitor may detect interactions with specific types of data. For example, data may be explicitly (e.g., by human labeling) or implicitly (e.g., based on rules or a trained machine learning algorithm) characterized as one of a number of types such as financial data, legal data, confidential data, sensitive data, personally identifying information, controlled data, public data, third-party provided data, and so forth. While data may be flagged for monitoring for integrity, interactions with only certain information types within the set of data, such as a confidential type of data may trigger capturing and reporting the interaction(s). Context may also or instead include a sensitivity of information detected in the data. Information may be deemed sensitive based on a range of criteria, including without limitation a timing of the information, a source of the information, content of the information, and so forth. As an example, information with a future release date (e.g., a company's quarterly earnings) that may become public when released, may be deemed to include sensitive information and therefore be monitored for integrity interactions at least until the public release date/time.

Context may include a data control rule that specifies permitted file interactions. The data control rule may indicate permitted interactions with a file, such as permitted file transfers, a destination, a file extension, a file type, and the like. A corresponding data monitoring rule may echo these data control rule interactions so that permitted changes or other interactions with a file may not be reported as potential integrity impacting changes. Context may also or instead include a data control rule that specifies excluded file interactions. The data control rule may indicate excluded file transfers and the like. A corresponding data monitoring rule may echo these data control rule excluded interactions so that any changes or other interactions with a file (e.g., a file or other data set identified in the data control rule) would be reported as potential integrity impacting changes. Context may also or instead include data pattern detection. In embodiments, data patterns detected on a compute instance may facilitate automatic adaptation and/or adoption of data monitoring rules. A data pattern detected in a data source (e.g., a file on the compute instance and the like) may indicate that the data source should be monitored for data integrity events, or may provide a baseline of ordinary usage against which deviations or variations are measured. In another aspect, explicit user input may be periodically requested to assist in distinguishing usual data usage from unusual data usage. For example, if a high frequency or volume of data access occurs, the file integrity monitor or rules engine may present a query to a user as to whether the particular activity is (a) acceptable or intended, and (b) typical or atypical. This information, or similar types of information, may be used to develop future monitoring rules for the affected data. Similarly, context may include indications of actions being performed on or by the compute instance, such as an attempt to shut down an operating system executing on the compute instance, an attempt (independent of the success thereof) to force an application executing on the compute instance to be quit, execution of remedial action by a threat management facility associated with the data integrity monitor, prevention of data leakage, and the like.

In embodiments, monitoring rules (either contextual/dynamic, or user-specified) may be based on applicable, external data standards. For example, monitoring may be based on one or more of Payment Card Industry standards, Health Insurance Portability and Accountability Act (HIPAA) standards, General Data Protection Regulation standards, and so forth. As an example, a HIPAA standard may designate certain types of information in a health data record as critical for ensuring proper treatment of the patient associated with the record. This information, may be identified by data type, file type, file metadata and the like. The methods and systems for dynamic data monitoring rule generation may generate rules for monitoring data usage of any data covered by the HIPAA standard. In embodiments, the methods and systems for file integrity monitoring and dynamically managing data monitoring rules herein may facilitate automated compliance with data security standards, such as PCI:DSS and the like, e.g., by monitoring for data usage or access covered by the standard.

More generally, any context for a compute instance or the data and/or files used by the compute instance may be used to dynamically create file monitoring rules suitable for maintaining the integrity of data and files on the compute instance.

The threat management facility 1220 may include any of the threat management facilities described herein. In general, the threat management facility 1220 may be coupled in a communicating relationship with the compute instance 1208 and configured to analyze data from the file integrity monitor 1202 in order to detect a threat on the compute instance 1208 or initiate a remediation of the compute instance 1208. The threat management facility 1220 may also assist in configuring the file integrity monitor as described herein, and may host a user interface for remote management of the file integrity monitor 1202. The threat management facility 1220 may also store various monitoring rules, cooperate with a local security agent to manage security of the compute instance 1208, and so forth.

Referring to FIG. 13 a user interface for managing use of compute instance context for dynamically adapting data monitoring rules is depicted. Use of compute instance context for generating and/or adapting data monitoring rules may be controlled through this interface 1300. Users may select one or more compute instance context entries to be used by the methods and systems of dynamic data monitoring rule management. Thus, a user may specifically select certain whether certain context-dependent rules will be dynamically applied during operation of a compute instance. The user interface 1300 may also permit user control over whether such rules can impact (e.g., override or modify) other types of rule sets such as user-specified rules or operating system (or platform) rules.

The above systems, devices, methods, processes, and the like may be realized in hardware, software, or any combination of these suitable for a specific application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made without departing from the spirit and scope of this disclosure and are intended to form a part of the invention as defined by the following claims.

What is claimed is:

1. A computer program product comprising computer executable code embodied in a non-transitory computer readable medium that, when executing on one or more computing devices, performs the steps of:
    instrumenting a compute instance with a file integrity monitor, the file integrity monitor configured with a number of rules to detect interactions with files on the compute instance;
    creating a first set of rules in the number of rules for the file integrity monitor to detect changes in the files based on an operating system for the compute instance, wherein the first set of rules is created automatically based on a detection of the operating system for the compute instance;
    creating a second set of rules in the number of rules for the file integrity monitor to detect changes in the files based on a file monitoring specification received from a user, wherein the second set of rules is created in response to a user selection to perform custom file integrity monitoring;
    dynamically managing one or more additional rules in the number of rules for the file integrity monitor to detect interactions with the files based on a context of the compute instance, wherein the one or more additional rules vary over time according to the context detected by a local security agent executing on the compute instance, and wherein the context includes an attempt to tamper with one or more protected files on the compute instance;
    updating the one or more additional rules based on one or more events detected on the compute instance indicative of a change in a security posture of the compute instance;
    monitoring data usage on the compute instance according to one or more rules of the number of rules including at least one of the first set of rules automatically created for the operating system, at least one of the second set of rules created in response to the user selection, and at least one of the one or more additional rules selected dynamically according to the context detected by the local security agent; and
    reporting one or more events impacting file integrity based on one or more rules of the number of rules.

2. The computer program product of claim 1 further comprising code that performs the step of monitoring the files with the file integrity monitor according to the number of rules.

3. The computer program product of claim 2 further comprising reporting detections by the file integrity monitor based upon the number of rules to a threat management facility for an enterprise network associated with the compute instance.

4. A method comprising:
    instrumenting a compute instance with a data integrity monitor, the data integrity monitor configured with a number of rules to report events in response to interactions with data on the compute instance;
    creating a first set of rules in the number of rules for the data integrity monitor to detect changes in the data based on an operating system for the compute instance, wherein the first set of rules is created automatically based on a detection of the operating system for the compute instance;
    creating a second set of rules in the number of rules for the data integrity monitor to detect changes in the data based on a data monitoring specification received from a user, wherein the second set of rules is created in response to a user selection to perform custom file integrity monitoring;
    dynamically managing one or more additional rules in the number of rules for the data integrity monitor to detect interactions with the data based on a context of the compute instance, wherein the one or more additional rules vary over time according to the context detected by a local security agent executing on the compute instance;
    updating the one or more additional rules based on one or more events detected on the compute instance indicative of a change in a security posture of the compute instance;
    monitoring data usage on the compute instance according to one or more rules of the number of rules including at least one of the first set of rules automatically created for the operating system, at least one of the second set of rules created in response to the user selection, and at least one of the one or more additional rules selected dynamically according to the context detected by the local security agent; and
    reporting one or more events impacting file integrity based on one or more rules of the number of rules.

5. The method of claim 4 wherein the context includes an attempt to tamper with one or more protected files on the compute instance.

6. The method of claim 4 wherein the context includes a signal from a data leakage prevention system for the compute instance.

7. The method of claim 4 wherein the context includes an indication of compromise for the compute instance.

8. The method of claim 4 wherein the context includes information from an installer for one or more applications installed on the computer instance.

9. The method of claim 4 wherein one of the additional rules specifies at least one of a reputation of an application interacting with the data, an authentication level of a source of interactions with the data, and a type of application interacting with the data.

10. The method of claim 4 wherein one of the additional rules specifies a type of information in the data for a detected interaction.

11. The method of claim 4 wherein one of the additional rules specifies a sensitivity of information in the data for a detected interaction.

12. The method of claim 4 wherein one of the number of rules is a data control rule specifying a permitted file interaction based on at least one of a destination, a file name, a file extension, and a file type associated with a permitted file transfer or an excluded file transfer.

13. The method of claim 4 wherein one of the number of rules is a content control rule specifying conditions for permitted interactions with a data type including at least one of confidential data, financial data, and personally identifiable data.

14. The method of claim 4 wherein at least one of the number of rules is selected for compliance with a policy based on one or more of Payment Card Industry standards, Health Insurance Portability and Accountability Act standards, and General Data Protection Regulation standards.

15. The method of claim 4 further comprising providing a user interface for interaction with the number of rules for the compute instance.

16. The method of claim 4 wherein the first set of rules include default rules provided for the compute instance based on a detection of the operating system.

17. The method of claim 4 wherein the context includes interactions detected according to at least one of the first set of rules and the second set of rules.

18. The method of claim 4 wherein the change in the security posture includes detecting a tamper attempt associated with a file, and wherein updating the one or more additional rules includes adding a rule to monitor at least one of the file and a file directory associated with the file.

19. A system comprising:
a file integrity monitor deployed on a compute instance, the file integrity monitor executing on a processor and configured to report file integrity impacting events in response to indications of interactions with data on the compute instance;
a number of file integrity monitoring rules including a first set of rules by which the file integrity monitor detects indications of changes in files based on characteristics of an operating system for the compute instance and a second set of rules by which the file integrity monitor detects indications of changes in the data based on a data monitoring specification received from a user, wherein the first set of rules is created automatically based on a detection of the operating system for the compute instance and the second set of rules is created in response to a user selection to perform custom file integrity monitoring; and
a rules engine, executing on a processor, that adapts the number of file integrity monitoring rules based on a context of the compute instance in order to dynamically adjust one or more additional rules in the number of file integrity monitoring rules based on additional information about the compute instance provided by the context, the rules engine further updating the one or more additional rules in the number of file integrity monitoring rules based on one or more events detected on the compute instance indicative of a change in security posture of the compute instance,
wherein the file integrity monitor is further configured for monitoring data usage on the compute instance according to one or more rules of the number of rules including at least one of the first set of rules automatically created for the operating system, at least one of the second set of rules created in response to the user selection, and at least one of the one or more additional rules selected dynamically based on the additional information about the compute instance provided by the context, and for reporting one or more events impacting file integrity based on one or more rules of the number of rules.

20. The system of claim 19 further comprising a threat management facility coupled in a communicating relationship with the compute instance and configured to analyze data from the file integrity monitor in order to detect a threat on the compute instance or initiate a remediation of the compute instance.

* * * * *